United States Patent Office 3,510,347
Patented May 5, 1970

3,510,347
OXIDATION RESISTANT CARBON
Henry H. Strater, Cleveland, Ohio, assignor, by mesne assignments, to The Carborundum Company, Niagara Falls, N.Y., a corporation of Delaware
No Drawing. Filed Sept. 2, 1964, Ser. No. 394,058
Int. Cl. C01b 25/32, 25/36
U.S. Cl. 117—169        12 Claims

ABSTRACT OF THE DISCLOSURE

A new composition of matter, calcium aluminum oxyphosphate, has outstanding utility as an oxidation inhibitor for carbon and graphite bodies. The composition is formed by interacting calcium-, aluminum-, and oxyphosphate-containing compounds, e.g. CaO, $Al_2O_3$, and $P_2O_5$. A preferred synthesis comprises reacting calcium hydroxide and aluminum hydroxide in an aqueous solution of phosphoric acid. To improve oxidation resistance of carbon or graphite bodies, utilizing the new composition, a portion of the composition is deposited on and preferably into the body, e.g. by spraying or brushing a solution of the composition onto the body, or by allowing the body to soak in such a solution.

---

The present invention relates to improving the oxidation resistance of carbon and graphite compounds and, more particularly, to a novel impregnant for porous carbon bodies which effects such improvement.

The ability of carbon to withstand high temperatures is well known. As a result carbon, usually in the form of graphite, has been employed in various desired shapes for high temperature applications, for example, as a pump impeller for handling molten metal, furnace and runner linings, mold stock for the pouring or casting of molten metals and other hot molten compositions, and more recently for diverse aerospace applications.

However, a serious shortcoming for carbon in such areas of high temperature use is its erosion or gradual consumption in an oxidizing atmosphere. The carbon part appears slowly to shrink. This is especially true if the molten or hot composition itself should exert an oxidizing effect upon the carbon as occurs, for instance, in the casting of fused aluminum. Indeed, above about 500° C. carbon has quite poor oxidation resistance.

Accordingly, various attempts have been made to improve the oxidation resistance of carbon. For example, U.S. Pat. 2,685,539 to Woodburn et al. teaches the use of aluminum phosphate as in impregnant for carbon; U.S. Pat. 2,685,540 to Woodburn et al. discloses the use of magnesium phosphate for the same purpose; U.S. Pat. 2,685,541 to Woodburn et al. divulges the use of calcium phosphate, and U.S. Pat. 2,685,542 to Woodburn et al. discusses the use of certain alkali metal phosphates as a corrosion resistance imparting impregnant for carbon. The disclosures of these patents are hereby incorporated by reference.

It has now been discovered that the conjoint use of calcium and aluminum with an oxyphosphate compound not only results, through interreaction, in a novel compound, but this compound unexpectedly provides superior results as an oxidation inhibitor for carbon as contrasted with the use of either calcium phosphate or aluminum phosphate alone.

It is, therefore, a principal object to provide a novel composition of matter and particularly one having outstanding utility as an oxidation inhibitor for carbon and graphite.

Another object is to provide an impregnated carbon body having increased resistance to oxidation.

A further object is to provide a carbon or graphite body having improved resistance to erosion by molten metals; to oxidation by the atmosphere; or to oxidation from hot or liquid materials which normally oxidize carbon or graphite.

Other objects will be apparent from the following description.

The novel composition of matter of the invention comprises the interreaction product of calcium, aluminum, and oxyphosphate-containing compounds, exemplified by calcium oxide, aluminum oxide, and phosphorus oxide, preferably as CaO, $Al_2O_3$, and $P_2O_5$. The resultant reaction product is here and in the claims defined by the term "calcium aluminum oxyphosphate." Some of the various routes of chemical reaction which may be taken to form this compound, as well as its manner of use to impregnate carbon, are discussed by the following sections.

PREPARATION OF IMPREGNANT

As indicated, the components which form the impregnant are calcium, aluminum, and oxyphosphorus-containing reactants, and especially the oxides of these elements. In practice, it is convenient to use compounds capable of generating, releasing, or otherwise offering these elements or compounds for the desired interreaction. The oxyphosphorus component provides the source of oxygen for the calcium aluminum oxyphosphate to be formed, although the other elements, calcium and aluminum, are preferably already at least partially oxidized and therefore present and used as the oxide. The reaction takes place, normally with heat, in an aqueous medium which must have an acid pH.

More particularly, the calcium-containing reactant may be one or more (that is, mixtures) of the following: tricalcium phosphate, monocalcium phosphate, calcium pyrophosphate, dicalcium phosphate, tetracalcium orthophosphate, decacalcium orthophosphate, ammonium calcium dimetaphosphate, calcium chloride, calcium bromide, calcium fluoride, calcium carbonate, calcium oxide, calcium aluminate, calcium nitrate, calcium acetate, and calcium (elemental).

The aluminum-containing reactant may be one or more of the following: tribasic aluminum phosphate, monobasic aluminum phosphate, dibasic aluminum phosphate, aluminum pyrophosphate, aluminum acid phosphate, aluminum metaphosphate, aluminum chloride, aluminum bromide, aluminum fluoride, aluminum oxide, aluminum carbonate, aluminum nitrate, aluminum acetate, calcium aluminate, and aluminum (elemental).

The oxyphosphorus reactant may be one or more of the oxy acids of phosphorus (especially ortho-phosphoric acid), anhydrides of those acids, and mono and diammonium salts of those acids.

In one technique of preparing the impregnant, the oxides of calcium and aluminum only are interreacted initially to form a calcium aluminate which is then oxyphosphated. A preferred technique is to react calcium hydroxide and aluminum hydroxide in an aqueous solution of phosphoric acid, for example, about 50 to 60 percent phosphoric acid solution. Calcium and aluminum form different calcium aluminates which vary only in the mol ratios of the two oxides or equivalent compounds. For instance, the following calcium aluminates may be used:

$3CaO \cdot 5Al_2O_3$
$CaO \cdot Al_2O_3$
$12CaO \cdot 7Al_2O_3$
$3CaO \cdot Al_2O_3$ Thus the ratio of calcium oxide to aluminum oxide may range from about 0.60:1 to about 3:1, respectively. All of such compounds are hereby contemplated by the term "calcium aluminate." The oxyphosphating of the calcium aluminate may be effected by heating an acidic aqueous solution of the calcium aluminate and any one of the indicated oxyphosphorus-containing reactants. One satisfactory mol ratio of calcium aluminuate, for example, $CaO \cdot Al_2O_3$, having a 1:1 ratio of calcium oxide to aluminum oxide, and to the acid anhydride, $P_2O_5$, is 0.26:1, respectively.

Of course, the calcium aluminum oxyphosphate of this invention need not necessarily be prepared in the manner just indicated. The calcium-containing reactant can first be oxyphosphated, and the resulting reaction product then further reacted with the aluminum-containing reactant. Similarly, the aluminum-containing reactant can first be oxyphosphated, followed by treatment with the calcium-containing reactant.

Water is a convenient solvent for the reactants and should have an acid pH in order to avoid chemical destruction of the oxyphosphorus ingredient as well as to solubilize the end product, calcium aluminum oxyphosphate. Usually, orthophosphoric acid may be used to acidify the water and simultaneously supply any additional phosphating agent that may be needed. If there is no deficiency in the amount of the oxyphosphorus reactant, other acids may be used to insure an acid pH, such as sulfuric acid, hydrochloric acid, nitric acid, acetic acid, and the like. If such non-phosphorus-containing acids are used, for example, in reacting tricalcium phosphate with tribasic aluminum phosphate, a calcium aluminum oxyphosphate having 1 equivalent of phosphate, based on the total amount of calcium oxide and aluminum oxide (calcium aluminate) present, is obtained. Higher amounts of phosphate can also be used, as hereinafter disclosed.

In general, raising the temperature of the solution a relatively small amount over room temperature (taken as about 24° C.) promotes the desired reaction to some extent. To reduce the time required at such relatively low temperatures to practical considerations, the solution can be heated to a temperature within the range of about 100° C. to about 105° C. for such time as may be needed to bring about the reaction and, preferably, evaporate the normally aqueous solvent employed in order simultaneously to deposit the reaction product in the pores of the carbon body.

As used herein, the term "solution" means a solution of calcium aluminum oxyphosphate, or a solution of components capable of interreacting and forming the calcium aluminum oxyphosphate, as by the application of heat thereto.

USE OF IMPREGNANT

The impregnant is used on a previously formed and/or shaped body or article of carbon as distinguished from adding the impregnant to a "green" carbon mix followed by baking. As an example, the amorphous or "gas-baked" carbon, graphitized, or ungraphitized, known in the art may be treated in accordance with the present invention. The methods of manufacturing the carbon or graphite body form no part of the present invention.

To improve the oxidation resistance of a carbon or graphite body, it is necessary only to deposit some of the present impregnant on and preferably into a desired area of the body. This may be most conveniently accomplished by spraying or brushing the solution onto the body or by allowing the body to soak in the solution, preferably in a heated solution. Since a carbon body is usually porous, some penetration by the solution is practically assured. After treatment with the solution, the carbon body may be dried to drive off the solvent and deposit the desired impregnant. When the solution contains components capable of interreacting to form the calcium aluminum oxyphosphate, the drying step may be of such severity as needed to promote the reaction and form the desired end product.

When it is desired to load the carbon body with a greater amount of impregnant than may be possible by brushing, spraying, soaking, etc., this may be accomplished by placing the carbon body in a container which is then evacuated, for example, to a vacuum "pull" of about twenty-five to thirty inches of mercury. With the container still under vacuum, a solution as herein described is then admitted to the container and allowed to penetrate the body. Preferably, the container is next pressurized as an aid to further or total impregnation of all of the available voids or pores in the carbon body. Ordinarily, a period of about 45 to about 120 minutes suffices for this operation.

The carbon body, impregnated as just described, is then dried for several hours at an elevated temperature, suitably about 100° C., followed by a baking operation at temperatures up to 500° C. in order to insure that all of the solvent of the solution is removed to complete the reaction when that is needed. For example, the carbon body may be dried at about 100° C. to about 110° C. for four to twenty hours and then baked at a temperature of about 250° C. to about 500° C. for about four additional hours.

A carbon or graphite body can of course be subjected to any one of the several impregnating techniques one or more times, or to one or more of the differing techniques consecutively in order to increase further the extent and amount of impregnation. For instance, a multi-impregnation can be carried out in which a carbon body follows the cycle of evacuation-impregnation-pressurization at least twice.

The amount of impregnant incorporated into the carbon body depends upon the ultimate use and demands expected on the final refractory product. Generally, however, from about one percent to about ten percent of the impregnant, based on the weight of the carbon article, suffices.

EXAMPLES

Example 1

Calcium aluminate, having a 1:1 mol ratio of calcium oxide to aluminum oxide was solubilized in a mixture having this weight percent composition:

| Ingredient: | Percent |
| --- | --- |
| CaO | 2.08 |
| $Al_2O_3$ | 3.72 |
| $P_2O_5$ | 20.20 |
| $H_2O$ | 74.00 |

The calcium oxide and aluminum oxide were present as a calcium aluminate having a molecular weight of 158.02. The phosphate compound was present with the water as phosphoric acid. The solution had a specific gravity of 1.260 at 24° C.

A standard porous graphite specimen in the form of a one inch cube was placed in a container subsequently evacuated to 29 inches of mercury. This conidtion was maintained for about 45 minutes. The above impregnating solution was then admitted to the container in a sufficient amount to cover the specimen, and the system next returned to atmospheric pressure for about 45 minutes. The resulting impregnated graphite specimen was dried at 100° C. for about four hours and then the temperature was gradually raised to about 500° C. over a period of time of about four additional hours. This procedure was repeated once again on the same specimen.

The same procedure was then carried out, including the double-impregnation treatment, on another graphite specimen of the same nature and like size. However, the impregnating solution was one prepared in accordance with U.S. Pat. 2,685,539, namely, a 25 percent aqueous solution of aluminum phosphate in a mol ratio of $Al_2O_3$ to $P_2O_5$ of 0.4:1, respectively.

It was noted that the specimen containing the present impregnant of this invention gained 4.7 percent in weight after the impregnation, while the specimen having the impregnant of Pat. 2,685,539 gained 4.91 percent in weight, indicating more impregnant was present in the latter specimen.

Oxidation tests of both cubes were simultaneously carried out by heating the cubes in a muffle furnace at 800° C. (previously brought to this temperature for the test) for four hours while passing air through the furnace at a rate of two liters per minute. The specimen of the present invention was then weighed and found to have lost 4.57 percent in weight; the other specimen was weighed and found to have lost 6.44 percent in weight. If an oxidation resistance index (ORI) is calculated according to the formula:

$$ORI = \frac{\text{percent loss of weight of specimen} \times 100}{\text{percent loss of weight of blank}}$$

the ORI for the specimen of the present invention was 9.94, while that for the specimen, impregnated in accordance with U.S. Pat. 2,685,439, was 15.88. The percent loss by weight of a "blank" is of course the loss in weight of a one inch cube of the same graphite without any impregnant under the same oxidation test conditions. The lower the ORI, the better is the oxidation resistance. Thus the specimen of the present invention afforded an ORI, i.e., an improvement, reduction of 37 percent compared to the specimen of U.S. Pat. 2,685,539, even though the former specimen had less impregnant.

Example 2

A procedure was carried out like the procedure of Example 1 for further comparing the present impregnant with that of U.S. Pat. 2,685,539. In this case, the present impregnating solution comprised in weight percent:

| Ingredient | Percent | Equivalents per kilogram |
|---|---|---|
| CaO | 3.60 | 1.286 (Ca) |
| Al$_2$O$_3$ | 2.20 | 1.296 (Al) |
| P$_2$O$_5$ | 19.20 | 8.112 (H$_3$PO$_4$) |
| H$_2$O | 75.00 | |

The calcium aluminum oxides were present as a calcium aluminate having the formula 3CaO·Al$_2$O$_3$. The specific gravity of the impregnating solution was 1.324 at 20° C. As can be seen from the above, the number of equivalents of phosphate, based on the total amount of calcium oxide and aluminum oxide present, is about 3.14. Thus, the calcium aluminum oxyphosphate of this invention can comprise from about 1 to about 3.14 equivalents of phosphate, based on the total amount of calcium oxide and aluminum oxide present.

Graphite test specimens were used measuring in inches 1 by 1 by 0.5. Two specimens were submerged in the above listed impregnating solution contained in a vessel adapted for evacuation. The vessel was then evacuated to a pressure equal to thirteen millimeters of mercury for about two hours. After this the specimens were dried at 110° C., after which the temperature was slowly raised to 450° C. At this time one specimen was found to have gained 2.47 percent in weight. The other specimen was resubmitted to the same treatment and found, after drying, to have gained overall 4.20 percent in weight. A third specimen was then treated in accordance with U.S. Pat. 2,685,539 using a 25 percent concentration of aluminum phosphate in a mol ratio of Al$_2$O$_3$ to P$_2$O$_5$ of 0.4:1, respectively. This specimen from a double impregnation had a gain in weight of 4.95 percent.

Oxidation tests were then carried out on these three specimens plus a blank specimen, using the oxidation test conditions of Example 1. The specimen of the present invention having a single impregnation was found to have an ORI of 8.25; while the specimen of the present invention having a double-impregnation was found to have an ORI of 7.58. However, the specimen impregnated in accordance with U.S. Pat. 2,685,539 had a much higher ORI, namely, 26.6.

Example 3

This example compared test data on the impregnant of the present invention with the calcium phosphate impregnant of U.S. Pat. 2,685,541.

The impregnating solution of the present invention was the same as that employed in Example 2. The impregnant of the cited patent consisted of a 25 percent aqueous solution of calcium phosphate having a mol ratio of 0.3CaO to one mol of P$_2$O$_5$. This last solution had a specific gravity of 1.240 at 25° C.

A one inch cube of porous graphite was employed for each of the impregnating solutions and treated in vacuo by the technique of Example 2. Three impregnating cycles were carried out for each specimen without heat drying between cycles. Instead, the specimens were dried by vacuum at room temperature after the first and second cycles of impregnation and finally dried after the third cycle by submitting the specimens to an ambient temperature of 110° C. which was gradually raised to 450° C. The gain in weight of the specimen containing the impregnant of this invention was 3.89 percent, while that of the specimen impregnated in accordance with Pat. 2,685,541 was 3.07 percent.

The impregnated specimens along with a blank specimen of the same size and graphite composition were then submitted to oxidation tests under the same conditions described in Example 1. After weighing the tested specimens and calculating the oxidation resistant index, as previously indicated, it was found that the ORI for a specimen of the present invention was 7.96, while that for the specimen treated in accordance with U.S. Pat. 2,685,541 was 16.0. Thus, the specimen of the present invention afforded a reduction of 50.25 percent in the ORI over the specimen of U.S. Pat. 2,685,541.

It will now be apparent that the present invention provides a novel composition of matter and, more especially, one having outstanding utility as an oxidation-inhibitor for carbon and graphite. The calcium aluminum oxyphosphate of the present invention is unique in itself and provides superior oxidation-resistant properties as compared to either aluminum phosphate or calcium phosphate used alone.

It will be understood that any combination of solutions which contain or which will form calcium aluminum oxyphosphate either at atmospheric temperatures or pressures or at elevated temperatures or pressures, are useful within the scope of the invention.

I claim:

1. As a composition of matter, calcium aluminum oxyphosphate comprising calcium oxide and aluminum oxide in a molar ratio ranging from about 0.60:1 to about 3:1, and from about 1 to about 3.14 equivalents of phosphate, based on the total amount of calcium oxide and aluminum oxide present.

2. An impregnant for improving an oxidation resistance of a porous carbon body consisting essentially of an acid aqueous solution containing calcium aluminum oxyphosphate comprising calcium oxide and aluminum oxide in a molar ratio ranging from about 0.60:1 to about 3:1, and from about 1 to about 3.14 equivalents of phosphate, based on the total amount of calcium oxide and aluminum oxide present.

3. A carbon body containing from about one percent to about ten percent, by weight, of an impregnant consisting essentially of calcium aluminum oxyphosphate comprising calcium oxide and aluminum oxide in a molar ratio ranging from about 0.60:1 to about 3:1, and from about 1 to about 3.14 equivalents of phosphate, based on the total amount of calcium oxide and aluminum oxide present.

4. A porous carbon body containing an impregnant consisting essentially of calcium aluminum oxyphosphate comprising calcium oxide and aluminum oxide in a molar ratio ranging from about 0.60:1 to about 3:1, and from about 1 to about 3.14 equivalents of phosphate, based on the total amount of calcium oxide and aluminum oxide present, to improve the oxidation resistance thereof.

5. The porous body of claim 4 wherein said carbon is graphite.

6. The porous body of claim 4 wherein said impregnant is formed by oxyphosphating a calcium aluminate.

7. The porous body of claim 4 wherein said impregnant is formed by interreacting calcium oxide, aluminum oxide, and phosphorus oxide.

8. The porous body of claim 4 wherein said impregnant is formed by interreacting calcium, aluminum, and oxyphosphate-containing reactants.

9. The porous body of claim 8 wherein said calcium-containing reactant is selected from the group consisting of tricalcium phosphate, monocalcium phosphate, calcium pyrophosphate, dicalcium phosphate, tetracalcium orthophosphate, decacalcium orthophosphate, ammonium calcium dimetaphosphate, calcium chloride, calcium bromide, calcium fluoride, calcium carbonate, calcium oxide, calcium aluminate, calcium, calcium nitrate, and calcium acetate, and mixtures thereof.

10. The porous body of claim 8 wherein said aluminum-containing reactant is selected from the group consisting of tribasic aluminum phosphate, monobasic aluminum phosphate, dibasic aluminum phosphate, aluminum pyrophosphate, aluminum acid phosphate, aluminum metaphosphate, aluminum chloride, aluminum bromide, aluminum fluoride, aluminum oxide, aluminum carbonate, calcium aluminate, aluminum, aluminum nitrate, and aluminum acetate, and mixtures thereof.

11. The porous body of claim 8 wherein said oxyphosphorus-containing reactant is selected from the group consisting of the oxy acids of phosphorus, the anhydrides of said acids, the mono and diammonium salts of said acids, and mixtures thereof.

12. A refractory porous carbon of improved resistance to oxidation comprising a body of gas-baked carbon and containing in pores thereof an amount of about one percent to about ten percent by weight of the body of an impregnant consisting essentially of calcium aluminum oxyphosphate comprising calcium oxide and aluminum oxide in a molar ratio ranging from about 0.60:1 to about 3:1, and from about 1 to about 3.14 equivalents of phosphate, based on the total amount of calcium oxide and aluminum oxide present.

References Cited

UNITED STATES PATENTS

| | | | |
|---|---|---|---|
| 2,456,367 | 12/1948 | Britton et al. | 23—105 X |
| 2,657,992 | 11/1953 | Woodstock | 23—105 X |
| 2,685,539 | 8/1954 | Woodburn et al. | 117—5.1 X |
| 2,685,540 | 8/1954 | Woodburn et al. | 117—5.1 X |
| 2,685,541 | 8/1954 | Woodburn et al. | 117—5.1 X |
| 2,702,425 | 2/1955 | Thompson | 23—105 X |
| 2,924,509 | 2/1960 | Huber et al. | 23—105 |
| 3,167,439 | 1/1965 | Vukasovich et al. | 117—135.1 |
| 3,179,527 | 4/1965 | Vukasovich et al. | 23—105 X |
| 3,194,632 | 7/1965 | Baniel et al. | 23—105 |
| 3,257,219 | 6/1966 | Klein | 23—52 X |

WILLIAM D. MARTIN, Primary Examiner

P. ATTAGUILE, Assistant Examiner

U.S. Cl. X.R.

23—52, 105, 108; 106—14, 38.27, 55; 117—5.1